Figure 2:
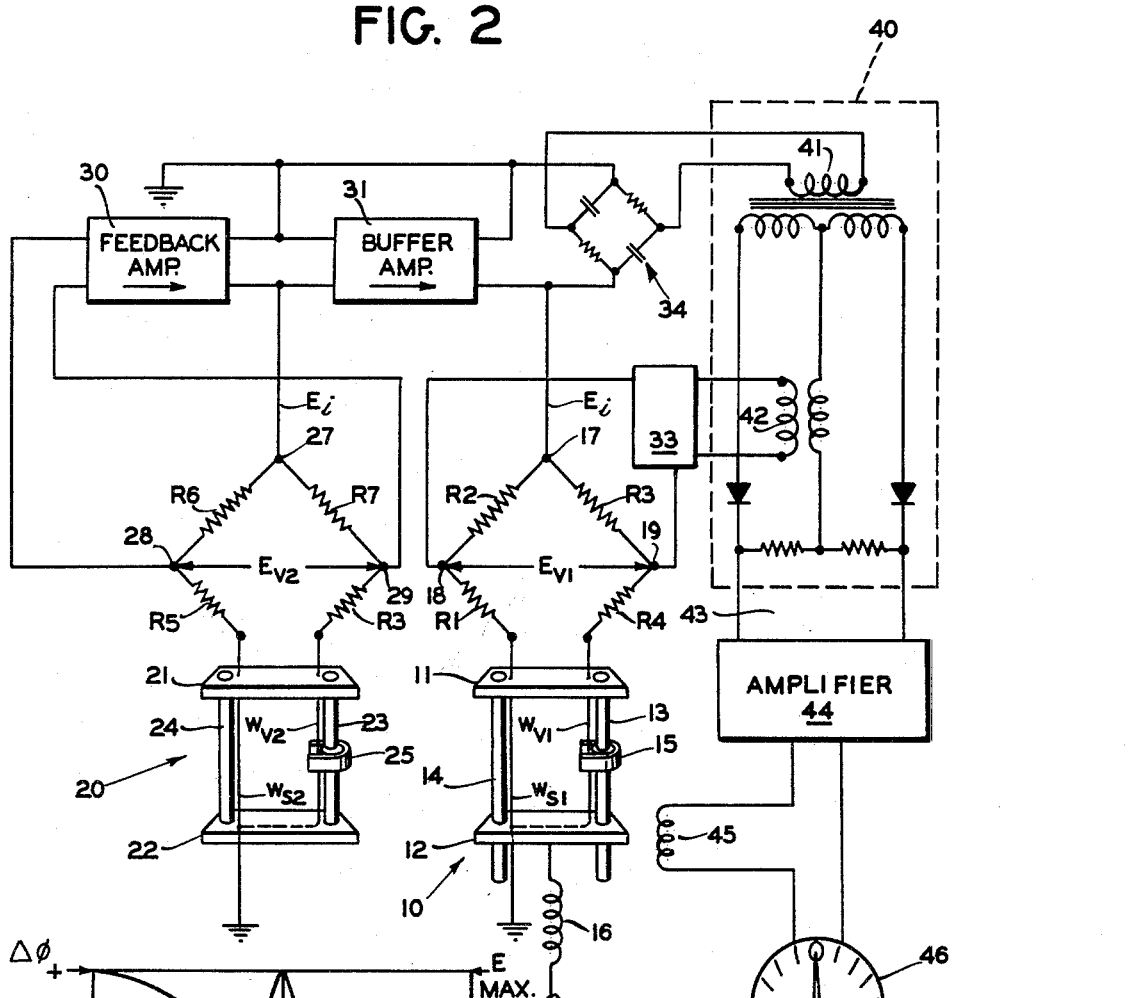

Jan. 8, 1963     J. D. PETERSON     3,071,974
FORCE MEASURING DEVICE
Filed Aug. 30, 1960     2 Sheets-Sheet 1
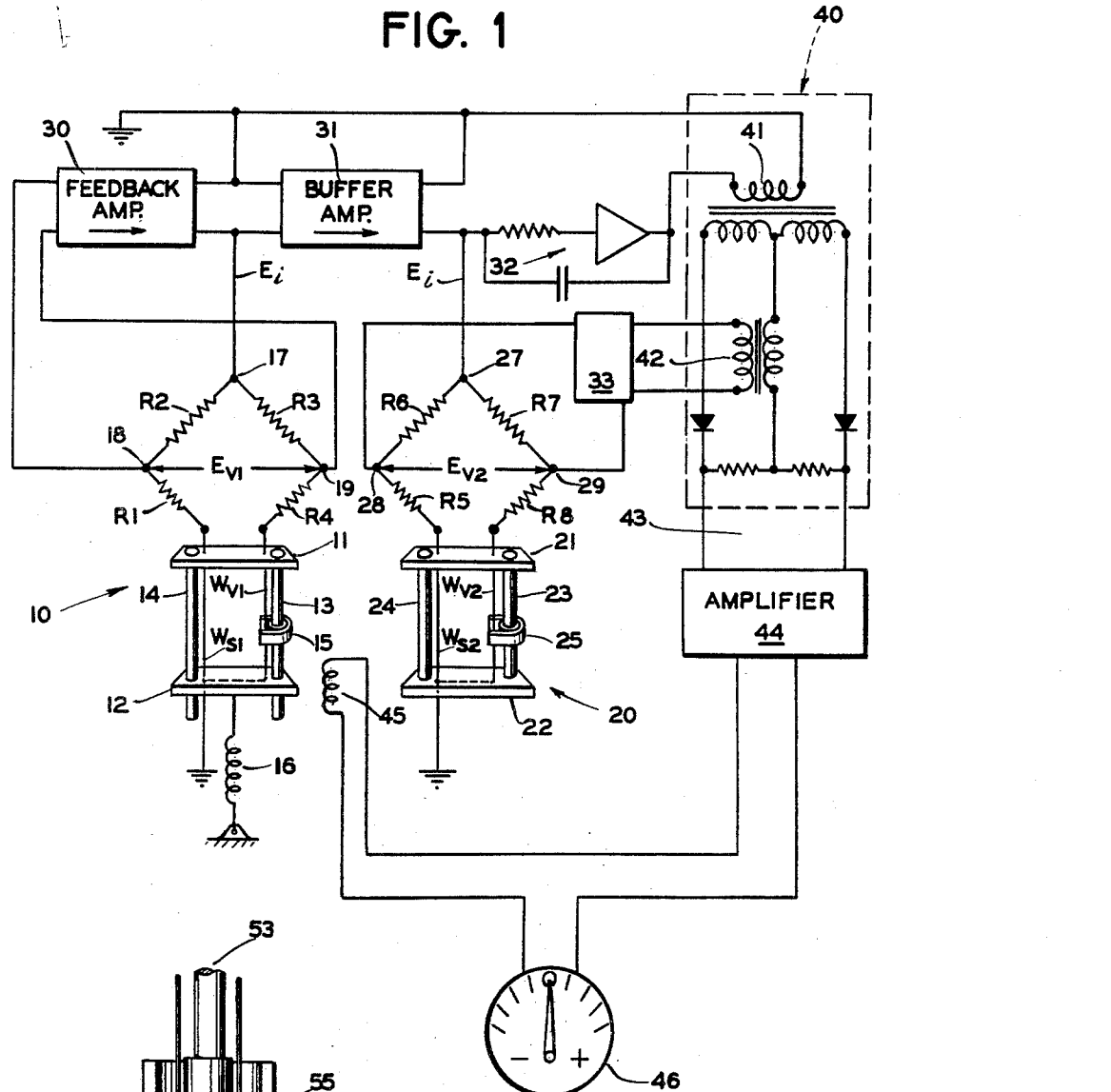
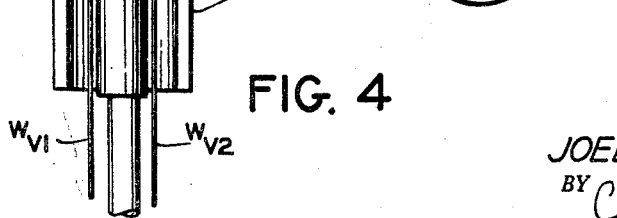
INVENTOR.
JOEL D. PETERSON
BY Charles J. Worth
AGENT Jan. 8, 1963   J. D. PETERSON   3,071,974
FORCE MEASURING DEVICE
Filed Aug. 30, 1960   2 Sheets-Sheet 2

INVENTOR.
JOEL D. PETERSON
BY Charles J. Worth
AGENT

United States Patent Office 3,071,974
Patented Jan. 8, 1963

3,071,974
FORCE MEASURING DEVICE
Joel D. Peterson, Westwood, N.J., assignor to The Bendix Corporation, Teterboro, N.J., a corporation of Delaware
Filed Aug. 30, 1960, Ser. No. 52,864
16 Claims. (Cl. 73—497)

This invention relates to means for measuring a physical force and specifically to such devices utilizing vibrating strings for producing signals in response and proportional to the imposed force.

A device according to this invention uses vibrating strings in a novel manner to provide an accurate means of measuring an applied force that may be used in various ways. However, it will be described herein as a device for measuring positive and negative acceleration of vehicles capable of flight.

Present day vehicles capable of flight are encountering greater ranges of flight conditions which are creating problems in measuring with conventional means. It is realized that information provided by surrounding atmosphere is attended by many variables which accentuate the measurement problems. Accordingly, new means are required to acquire measured data preferably based on stable basic information.

An object of this invention is to provide a highly accurate force measuring device simple in structure, and free from the effects of friction and material hysteresis.

Another object of this invention is to provide an accelerometer for airborne vehicles using stable basic information for measuring acceleration.

Another object of this invention is to provide a device using a vibrating string to measure the magnitude and direction of an applied force.

This invention contemplates a pair of wires disposed in magnetic fields having a common source of driving voltage provided by a feedback means connected to the output of one of the wires to cause both wires to vibrate at a resonant frequency and generate signals in phase with one another. A force responsive means is connected to one of the wires for changing its natural frequency in the presence of the force to cause one of the wires to be driven out of resonance. A phase discriminating means receives the generated signals from both wires producing a direct current in response thereto representing the magnitude and direction of the applied force. The direct current flow is applied to an indicator to provide a measure of the force, and to a coil to create a field that reacts on the force responsive means in opposition to the applied force.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only, and are not to be construed as defining the limits of the invention.

Figure 3:
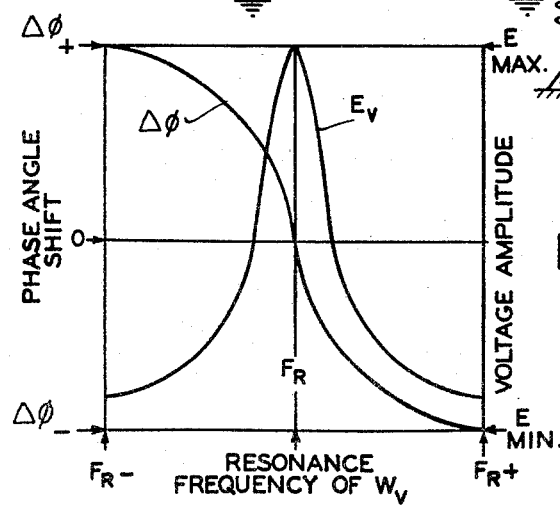

FIGURE 1 is a circuit diagram of a novel accelerometer constructed according to the invention, FIGURE 2 is a circuit diagram of a modification of the device of FIGURE 1, FIGURE 3 is a chart to illustrate the relative change in amplitude and phase angle of the output of a vibrating wire when driven out of resonance, and FIGURE 4 is an elevational view of a modified magnetic field driving means for the vibrating wires of FIGURES 1 and 2.

The novel device essentially consists of a pair of matched vibrating string generators providing identical output signals at resonance. One generator is sensitive and the other is insensitive to a force, such as acceleration. The generator output signals are applied to a comparing circuit, such as a phase angle discriminator, to provide a D.C. signal having magnitude and polarity as a function of the difference between the phase angles of the generated signals. The D.C. signal provides a measure of the acceleration imposed on the force responsive generator and is fed back to that device in a direction to oppose the action of the imposed force.

Referring specifically to FIGURE 1, there are two vibrating string assemblies 10 and 20. The assembly 10 is comprised of a resistance bridge having series connected legs R1, R2, R3 and R4, and a temperature compensated vibrating wire arrangement having a vibrating wire $W_{v1}$ connected at one end to resistance leg R4. The other end of vibrating wire $W_{v1}$ is connected to ground and to one end of a static wire $W_{s1}$ connected to resistance leg R1 at its other end. A framework is diagrammatically shown and has a plate 11 which fixedly supports and is insulated from the bridge connected ends of wires $W_{v1}$ and $W_{s1}$. A pair of leg members 13 and 14 are fixed to plate 11 and slidably support a second plate 12. The plate 12 supports and is insulated from the interconnected ends of wires $W_{v1}$ and $W_{s1}$. A magnet 15 is supported by and insulated from leg member 13 and provides a field in which wire $W_{v1}$ is positioned. Plate 12 is connected by spring means 16 to a fixed structure and is urged away from plate 11 to provide a predetermined constant tension on wires $W_{v1}$ and $W_{s1}$.

The plate 12 is so positioned that it will act with or against the spring 16 in response to the force of acceleration to vary the tension on the wires $W_{v1}$ and $W_{s1}$. The static wire $W_{s1}$ is included in this arrangement to compensate for changes in the resistance of vibrating wire $W_{v1}$ caused by ambient temperature fluctuations. The tension on the wires $W_{v1}$ and $W_{s1}$ caused by spring 16 is constant and consequently the normal frequency of wire $W_{v1}$ is undisturbed by temperature change. The output terminals 18 and 19 of the vibrating string assembly 10 at the junctions of resistance legs R1 and R2, and R3 and R4, respectively, are connected to the input of a feedback amplifier 30. The output of amplifier 30 is connected to the input 17 of assembly 10 at the junction of resistance legs R2 and R3 and to ground, and by a buffer amplifier 31 to the input 27 of the second vibrating string assembly 20 at the junction of resistance legs R6 and R7 of a resistance bridge and to ground.

The assembly 20 is generally similar to assembly 10 but is not responsive to acceleration. It is comprised of a resistance bridge having series connected legs R5, R6, R7 and R8, and a temperature compensated vibrating wire arrangement having a vibrating wire $W_{v2}$ connected at one end to resistance leg R8. The other end of the vibrating wire $W_{v2}$ is connected to ground and to one end of a static wire $W_{s2}$. The other end of static wire $W_{s2}$ is connected to resistance leg R5. A framework is diagrammatically shown and has a pair of plates 21 and 22 fixed to and maintained in spaced relation by leg members 23 and 24 to provide insulated connections for supporting the ends of wires $W_{v2}$ and $W_{s2}$ under tension. A magnet 25 is supported by and insulated from leg member 23 and provides a field in which wire $W_{v2}$ is positioned.

The static wire $W_{s2}$ is included in this arrangement to compensate for changes of resistance of vibrating wire $W_{v2}$ caused by fluctuations of ambient temperature. To maintain the tension of wires $W_{v2}$ and $W_{s2}$ constant as temperature fluctuates, leg members 23 and 24 have a rate of expansion equal to the wires. Although the frames for supporting the vibrating and static wires of assemblies 10 and 20, have been described in considerable detail, it should be understood that any other suitable arrangement may be used.

A phase discriminator 40 is used to measure the difference between the output signals $E_{v1}$ and $E_{v2}$ of the respective assemblies 10 and 20. The input 41 of phase discriminator 40 is connected through a phase shift network 32 to buffer amplifier 31 which, as explained, receives signals from output terminals 18 and 19 of assembly 10. Network 32 includes an amplifier to maintain the magnitude of the voltage applied to input 41 of discriminator 40 constant. The input 42 of phase discriminator 40 is connected to output terminals 28 and 29 of assembly 20 at the junctions of resistance legs R5 and R6, and R7 and R8, respectively, through a limiting amplifier 33 to provide constant magnitude voltage having a phase angle corresponding to the phase angle of signal $E_{v2}$. Amplifier 33 provides constant magnitude voltage to input 42 that is equal to the voltage applied to input 41. The discriminator 40 to provide no output signal requires the two input signals to be 90 degrees out of phase with each other. Since both devices 10 and 20 are matched to each other and driven by the same signal $E_i$, the respective output signals $E_{v1}$ and $E_{v2}$ are of the same phase when both wires $W_{v1}$ and $W_{v2}$ are vibrating at resonance. Therefore, phase shift network 32 is required to apply signals $E_{v1}$ and $E_{v2}$ in quadrature to discriminator 40.

In the presence of acceleration causing a difference in phase of signals $E_{v1}$ and $E_{v2}$, discriminator 40 produces a direct voltage signal at its output 43 connected to a direct current amplifier 44. The amplifier 44 provides a direct current having an amplitude and polarity corresponding to the magnitude and direction of the acceleration. The output of amplifier 44 is connected to an indicator 46 which indicates the magnitude and direction of the acceleration. The output of amplifier 44 is also connected to a coil 45 which provides a field opposing the force of the acceleration and urges plate 12 toward its zero acceleration position. The force of the field due to current flow through coil 45 is not quite sufficient to balance the effect of acceleration on plate 12. The remaining small unbalance causes plate 12 to arrive at an equilibrium position that maintains the phase shift necessary to provide the current flow and maintain the system in an equilibrium condition.

Before discussing the operation of the novel devices of FIGURES 1 and 2, it might be well to briefly consider the operation of vibrating wire conductors in a magnetic field together with FIGURE 3. When an alternating current is caused to flow in a wire conductor disposed in a magnetic field, the wire vibrates or oscillates at the frequency $f$ of the current. A counter-electromotive-force $E_v$ is induced in the wire conductor that is proportional to the field strength and the relative velocity between the wire and the field. Resonance occurs when the frequency of the current through the wire is equal to the natural frequency of the wire. At resonance $F_r$, the amplitude of the counter-electromotive-force $E_v$ is a maximum, and drops off as the vibration frequency $f$ increases or decreases. The counter-electromotive-force $E_v$ is considered at resonance $F_r$, as having zero phase angle shift. However, as the frequency $f$ increases beyond resonance there is a negative phase angle shift $\Delta\phi-$; and as the frequency decreases below resonance there is a positive phase angle shift $\Delta\phi+$. Thus, by using relative phase angle displacement of the output signals of a pair of matched vibrating wire assemblies having a common drive causing one wire to vibrate at resonance and the other to vibrate out of resonance in response to an applied force, the magnitude and direction of the applied force can be measured.

Referring now to FIGURE 1, in a stable or no acceleration condition, feedback amplifier 30 applies alternating voltage $E_i$ to input 17 of assembly 10 to cause an alternating current to flow through and drive vibrating wire $W_{v1}$ at resonance. Simultaneously, feedback amplifier 30 provides the alternating voltage $E_i$ through buffer amplifier 31 to input 27 of assembly 20 to cause an alternating current to flow through and drive vibrating wire $W_{v2}$ at resonance. The wires $W_{v1}$ and $W_{v2}$ of the matched vibrating wire assemblies 10 and 20, sharing a common source of driving voltage $E_i$, generate counter-electromotive-forces $E_{v1}$ and $E_{v2}$ across the output terminals 18, 19 and 28, 29, respectively, that are equal in amplitude and have a common phase angle. The output signal $E_{v1}$ of assembly 10 is fed back through amplifiers 30 and 31 to provide the driving voltage $E_i$, and also is applied through the 90° phase shift network 32 to input 41 of phase angle discriminator 40. Simultaneously, the output signal $E_{v2}$ is applied through limiting amplifier 33 to input 42 of discriminator 40 and is in quadrature to the voltage at input 41. With the voltages $E_{v1}$ and $E_{v2}$ applied to discriminator 40 in quadrature, there is no signal at output 43; thus no field is produced by coil 45, and indicator 46 remains at zero.

Under acceleration conditions, the small portion of force not balanced out by the magnetic field from coil 45 acts on plate 12, in the manner previously described, to change the tension of wires $W_{v1}$ and $W_{s1}$ and changes the natural frequency of vibrating wire $W_{v1}$. The feedback arrangement provided by amplifier 30 to assembly 10 causes wire $W_{v1}$ to generate an output voltage $E_{v1}$ to drive itself to resonance at the new natural frequency determined by the change of tension induced by acceleration, and to provide driving voltage $E_i$ at the same new frequency. The new frequency of voltage $E_i$ drives vibrating wire $W_{v2}$ at the new frequency which is non-resonant causing a shift of the phase angle of output voltage $E_{v2}$. The phase angle discriminator 40 detects the relative phase angle shift and provides a resulting proportional direct voltage signal at its output 43 to the direct current amplifier 44. The direct current amplifier 44, in turn, provides a corresponding direct current flow through coil 45 and indicator 46. The direct current flow is representative of the magnitude and direction of the acceleration to provide a reading on indicator 46, and with coil 45 creates a field which acts in opposition to the force of the acceleration to damp the movement of plate 12.

Referring now to FIGURE 2, the device shown is similar to that of FIGURE 1 except for the position of vibrating wire assemblies 10 and 20 which are reversed, and a phase angle network 34 which connects the output of buffer amplifier 31 to input 41 of discriminator 40 in place of phase shift network 32 of FIGURE 1. The different networks 32 and 34 are required because the voltage from amplifier 31 of FIGURE 1 tends to vary in magnitude while the voltage from amplifier 31 of FIGURE 2 remains constant. The assembly 20 being insensitive to acceleration provides an output $E_{v2}$ of fixed frequency and magnitude across terminals 28 and 29 that is now applied to the input of feedback amplifier 30. The output of amplifier 30 provides constant driving voltage $E_i$ to input 27 of assembly 20, and through buffer amplifier 31 to input 17 of assembly 10. The voltage from buffer amplifier 31 is applied across network 34, which causes a 90° phase shift, to input 41 of discriminator 40. The output terminals 18 and 19 are now connected to input 42 of discriminator 40 by limiting amplifier 33 and in the absence of acceleration provides signal voltage in quadrature to the voltage applied to input 41.

With the modified arrangement of FIGURE 2, the frequency of the driving voltage $E_i$ and the actual vibration frequency of each of the wires $W_{v1}$ and $W_{v2}$ remains constant at all times. In the presence of acceleration, plate 12 responds to the applied acceleration force and varies the tension of wire $W_{v1}$ and its natural frequency. Accordingly, wire $W_{v1}$ being driven out of resonance by the constant frequency voltage $E_i$ causes a phase shift of voltage $E_{v1}$ that is applied to input 42 of discriminator 40. The discriminator 40 sensing the relative phase shift between the voltages applied to inputs 41 and 42 again produces a direct voltage signal at its output 43 representative of the magnitude and direction of the acceleration.

Referring to FIGURE 4, the vibrating wire assemblies 10 and 20 may be constructed with a single wire supporting frame (not shown) that includes a common leg member 53 replacing leg members 13 and 23. Leg member 53 supports and is insulated from a magnet 55 that provides a field common to both vibrating wires $W_{v1}$ and $W_{v2}$. When assemblies 10 and 20 embody a common magnetic field, vibrating wires $W_{v1}$ and $W_{v2}$ must be adequately spaced to prevent interaction between the fields around the two wires that are created by the flow of driving current.

It should be realized that there are several ways of providing the same resulting signals with two circuits having common component parts. In brief, the device of FIGURE 1 provides a pair of matched vibrating wire assemblies 10 and 20 that are driven at resonance in the absence of acceleration by a common driving voltage $E_i$ from a feedback arrangement 30, receiving output voltage $E_{v1}$ from assembly 10. Vibrating wire $W_{v1}$ of assembly 10 in response to acceleration is driven to a new natural frequency and voltage $E_i$ causes wire $W_{v2}$ of assembly 20 to vibrate at the same frequency, out of resonance, causing a phase angle shift of the output signal $E_{v2}$. In the device of FIGURE 2, however, the output signal $E_{v2}$ of assembly 20 not being responsive to acceleration provides a constant output signal $E_{v2}$ to amplifier 30 to derive a constant driving voltage for wires $W_{v1}$ and $W_{v2}$. The natural frequency of wire $W_{v1}$ of assembly 10 changes in response to an acceleration force while its actual vibration frequency remains constant and is therefore driven out of resonance causing a phase shift of voltage $E_{v1}$.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device for measuring an applied force, comprising a pair of matched wires retained in tension each disposed in a magnetic field for generating a signal when vibrated, feedback means connected to receive the generated signal from one of the wires and to provide current flow through both wires to cause the wires to vibrate at a common frequency for generating signals that have corresponding phase angles in the absence of the applied force, means for varying the tension of one of the wires in response to the applied force for shifting the phase angle of one of the generated signals relative to the other, and phase angle comparing means connected to both wires to provide direct current flow at its output that represents the magnitude and direction of the applied force in response to the difference between the phase angles of the generated signals.

2. A device according to claim 1 and a coil connected to the output of the comparing means creating a field in response to the direct current flow that acts on the force responsive means in opposition to the applied force.

3. The measuring device according to claim 2 having means to compensate for changes of resistance of each of the wires in response to changes of ambient temperature.

4. The measuring device according to claim 2 having means for maintaining each of the wires in constant tension as the length of each wire changes in response to changes of temperature.

5. The measuring device according to claim 2 having a magnetic field common to both wires.

6. A device for measuring the magnitude and direction of an applied force, comprising a pair of matched vibrating wire generators each having an input to receive a driving voltage and an output for generated alternating voltage signals, feedback means connected to the output of one of the generators to receive its generated signal and to both inputs to provide the driving voltage to both generators for generating signals in phase with each other in the absence of the applied force, one of the generators being insensitive to the applied force and the other creating a phase difference between the generated signals in response to the applied force, and phase comparing means connected to the outputs of both generators to provide direct current flow at its output that represents the magnitude and direction of the applied force in response to the phase difference of the generated signals.

7. A device according to claim 6 and means connected to the output of the comparing means for applying a field to the force responsive generator that acts in opposition to the applied force in response to direct current flow.

8. The measuring device according to claim 7, and each generator including temperature compensating means for maintaining the associated generated signal constant in response to changes of temperature.

9. A device for measuring the magnitude and direction of an applied force, comprising a pair of matched vibrating wire generators each having an input to receive alternating driving voltage and an output for generated alternating voltage signals, feedback means connected to the output of one of the generators to receive its generated signal and to both inputs to provide the alternating driving voltage to drive both generators at the same frequency and at resonance for generating signals in phase with each other in the absence of the applied force, the generator having its output connected to the feedback means being responsive to the applied force for changing its natural frequency and the frequency of the alternating driving voltage for driving both generators at its new resonant frequency, the other generator having a fixed natural frequency being driven out of resonance by the driving voltage having a changed frequency in the presence of the applied force and generating a signal with a phase shift, phase comparing means connected to the outputs of both generators to provide direct current flow at its output that represents the magnitude and direction of the applied force in response to the shift in phase between the generated signals, and means connected to the output of the comparing means for applying a field to the force responsive generator that acts in opposition to the applied force in response to direct current flow.

10. A device for measuring the magnitude and direction of an applied force, comprising a pair of matched vibrating wire generators each having an input to receive fixed frequency alternating driving voltage and an output for generated alternating voltage signals, feedback means connected to the output of one of the generators to receive a generated signal and to both inputs to provide the alternating driving voltage to constantly drive both generators at the same fixed frequency and at resonance for generating signals in phase with each other in the absence of the applied force, the other generator being responsive to the applied force to change its natural frequency and being driven out of resonance by the alternating driving voltage in the presence of the applied force for generating a signal with a phase shift, phase comparing means connected to the outputs of both generators to provide direct current flow at its output that represents the magnitude and direction of the applied force in response to the shift in phase between the generated signals, and means connected to the output of the comparing means for applying a field to the force responsive generator that acts in opposition to the applied force in response to direct current flow.

11. A device for measuring an applied force comprising a pair of vibrating wires under tension each disposed in a magnetic field for generating a signal, means for vibrating the wires at the same frequency, means for varying the tension of only one of the vibrating wires in response to an applied force to change the natural frequency of the wire and the relative signals generated by the wires without changing the relative vibrating frequency of the wires, and means for comparing the signals generated by the wires to provide an output corresponding to the applied force.

12. The device according to claim 11 in which the comparing means compares the relative phase angles of the signals generated by the wires to provide an output corresponding to the applied force.

13. A device for measuring an applied force comprising a pair of vibrating wires under tension each disposed in a magnetic field for generating a signal voltage, means for vibrating the wires at a common resonant frequency in the absence of an applied force, means for increasing the tension of one of the vibrating wires in response to an applied force to change the resonant frequency of the wire and the relative phases of the signal voltages generated by the wires while vibrating both wires at the resonant frequency of one of the wires, and means for comparing the relative phases of the signal voltages generated by the wires to provide an output corresponding to the applied force.

14. A device for measuring an applied force comprising a pair of vibrating wires under tension each disposed in a magnetic field, means for vibrating the wires at resonant frequency in the absence of an applied force for generating signal voltages in phase with one another, means for varying the phase of the signal voltage generated by one of the wires in response to an applied force to provide a phase difference between the signal voltages generated by the wires while vibrating both wires at the resonant frequency of one of the wires, and means for measuring the phase difference to provide an output corresponding to the applied force.

15. A device for measuring an applied force comprising a pair of vibrating wires under tension each disposed in a magnetic field, means for vibrating the wires at a constant frequency and in resonance in the absence of an applied force for generating signal voltages in phase with one another, means for varying the tension of one of the vibrating wires to change its natural frequency and to shift the phase of the signal voltage generated by the wire while vibrating both wires at the resonant frequency of one of the wires, and means for comparing the relative phases of the signal voltages generated by the wires to provide an output corresponding to the applied force.

16. A device for measuring an applied force comprising a pair of vibrating wires under tension each disposed in a magnetic field, driving means for vibrating the wires at resonance in the absence of an applied force for generating signal voltages in phase with one another, one wire having a fixed natural frequency, means for increasing the tension of the other wire in response to an applied force to change the natural frequency of the wire and to cause the driving means to vibrate the wires at the new natural frequency of the other wire, the wire having a fixed natural frequency being driven out of resonance at the new natural frequency of the other wire to shift the phase of the signal voltage generated by the wire, and means for comparing the relative phases of the signal voltages generated by the wires to provide an output corresponding to the applied force.

References Cited in the file of this patent

UNITED STATES PATENTS

| 1,995,305 | Hayes | Mar. 26, 1935 |
| 2,574,336 | Libman et al. | Nov. 6, 1951 |
| 2,689,943 | Rieber | Sept. 21, 1954 |
| 2,725,492 | Allan | Nov. 29, 1955 |
| 2,774,872 | Howson | Dec. 18, 1956 |
| 2,775,700 | Ring | Dec. 25, 1956 |
| 2,939,072 | Bell | May 31, 1960 |

FOREIGN PATENTS

| 729,894 | Germany | Dec. 19, 1942 |
| 789,611 | Great Britain | Jan. 22, 1958 |